Sept. 21, 1965                    C. E. SOMMER                    3,207,024
                                DRILL POINT SCREW
Filed Aug. 20, 1962                                          2 Sheets-Sheet 1
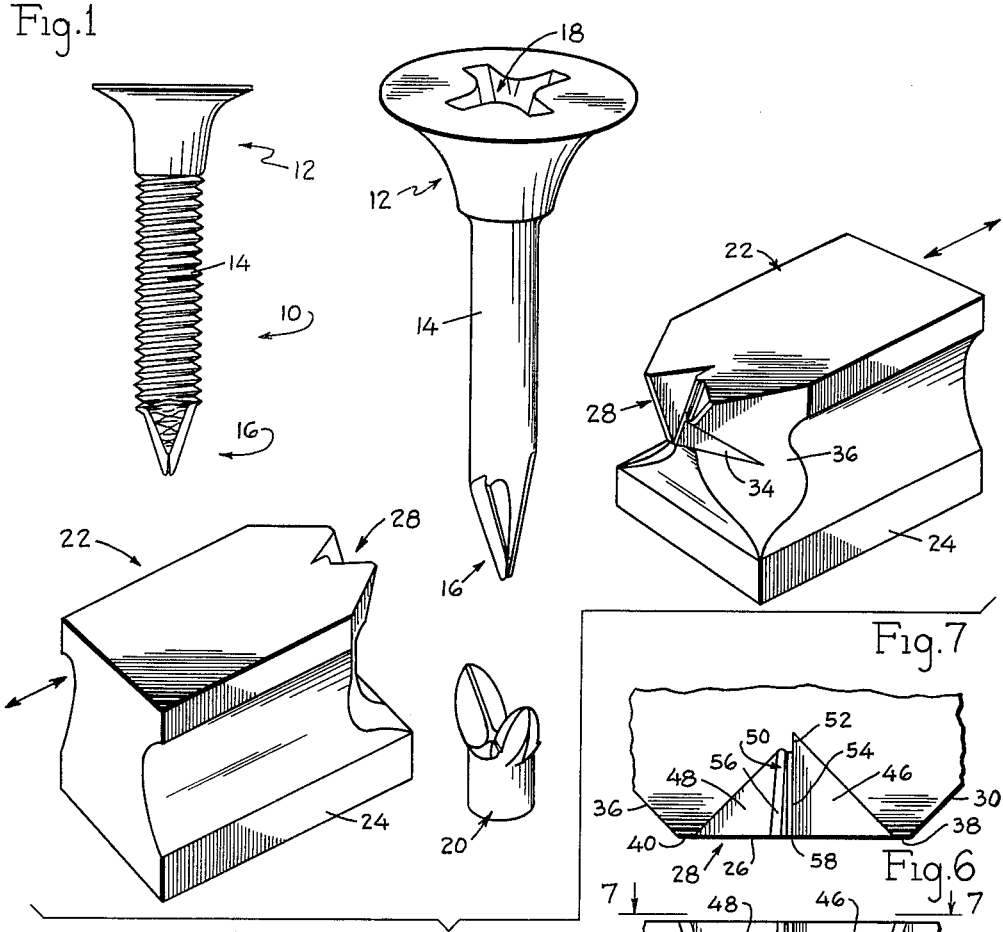
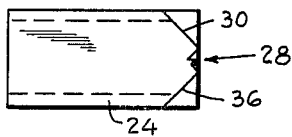
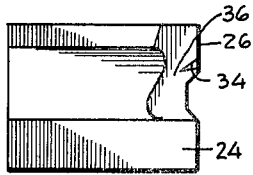
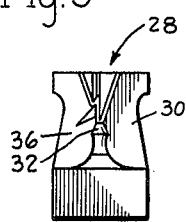
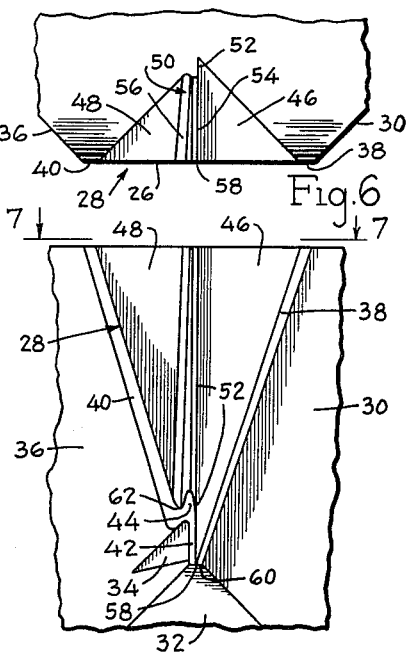
INVENTOR.
Charles E. Sommer
BY Robert D. Silver
                                                                ATTY.

Sept. 21, 1965  C. E. SOMMER  3,207,024
DRILL POINT SCREW
Filed Aug. 20, 1962  2 Sheets-Sheet 2
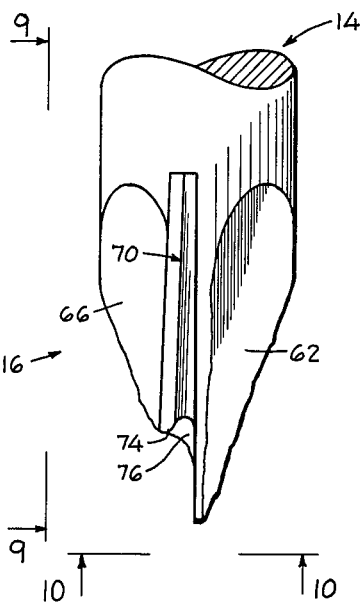
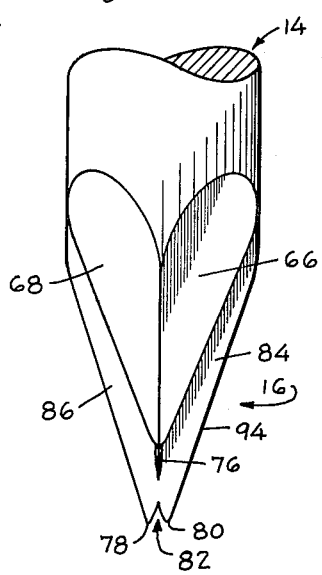
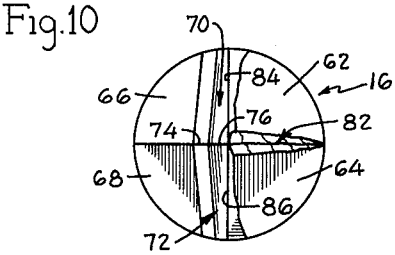
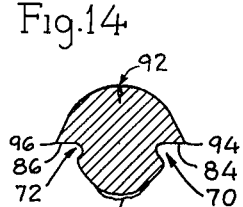
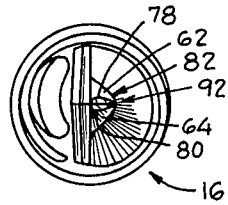
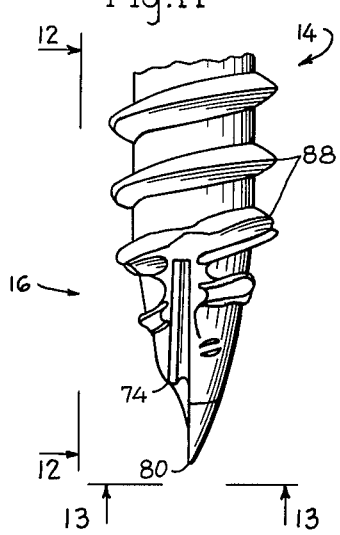
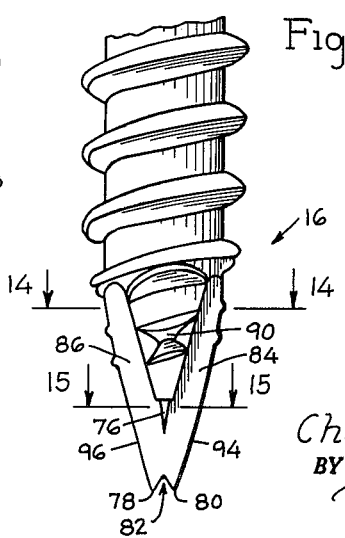
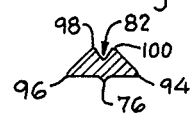
INVENTOR.
Charles E. Sommer
BY Robert D. Silver
ATTY.

United States Patent Office 3,207,024
Patented Sept. 21, 1965

3,207,024
DRILL POINT SCREW
Charles E. Sommer, Elgin, Ill., assignor to Illinois Tool
Works Inc., Chicago, Ill., a corporation of Delaware
Filed Aug. 20, 1962, Ser. No. 218,061
8 Claims. (Cl. 85—47)

This invention relates in general to a method and apparatus for forming a drill point on a screw blank and to the article so formed. More particularly, this invention relates to a special construction of a pinch pointing die and its coaction with a fastener blank and in addition relates to the drilling point so formed.

This application relates to an improvement in the method and apparatus for forming a drill point and the article so formed disclosed in the copending application of George L. Wieber, filed January 29, 1962, having Serial No. 169,325 and assigned to the same assignee. Fasteners, such as screws and nails, have heretofore been formed with a somewhat pyramidal shaped point which, through long usage, is commonly referred to as a nail point. In nails, the precise configuration of the point is generally not of major significance except in a most general way, since its penetration into the work material is by impact rather than by rotation The standard method of forming a so-called nail point on a fastener blank has become known as a "pinch pointing" technique and it involves the movement of two opposed dies toward each other in a manner to pinch off the end of a generally cylindrical shank so as to provide a rather sharp point. When a standard pinch pointing die is used to pinch off or point the entering end of a threaded fastener, such as a screw or the like, certain disabilities appear in the point. While the drilling characteristics of a pinch pointed screw which is made by the prior art procedures, is better than a blunt end, severe disabilities have been encountered, particularly, when the drilling screws are used for initial drilling of metal such as, for example, steel or other relatively hard work material. The nature of prior art pinch pointing techniques was such as to leave a very thin web or thin extension of material for the extreme tip of the fastener. This thin web while very sharp has the propensity of effectively elongating the point in a manner which is detrimental to efficient drilling. More particularly, this extension is very thin and very weak and has the tendency to be bent over in hoppering for the thread rolling operation on the fastener which is subsequential to the forming of the point. In those cases where the prior art thin web would not bend over in the hoppering for the thread rolling operation, a further problem developed in that the point became exceedingly brittle since it becomes completely cased in the hardening operation, and thus had a tendency to break off at the start of drilling. The breaking off of this thin point then exposes a soft core at the center of the screw which in turn made drilling impractical. A further prior art problem in forming drilling points on screws as distinct from nails relates to the fact that occasionally the nib representing the waste material, from the pinching operation, would stick to the end of this elongated point on the fastener blank. A nib stuck on the screw shank poses a severe hazard to gumming up the thread rolling apparatus, a problem not encountered in the forming of nails and the like.

The aforementioned Wieber application, provided an improved die and method of use of same which provides an improved pinch pointed drilling point on a fastener blank which overcomes the aforenoted problems of the prior art by a construction of the pinching dies in a particular configuration to withdraw material from the interior of the shank during the pinching operation to expose a shallow groove which bisected the point of the shank of the screw to provide twin drilling points and shallow grooves running up the sides of the point. While this method of pinching off screw points is very efficacious in solving the prior art problems aforenoted, the drilling points so formed and the grooves running up the sides which provided cutting edges were of such a shallow nature that improved chip clearance and sharper better defined cutting edges were most desirable for drilling certain materials. Further, in those instances where it was necessary or desirable to thread the entering end portion to a point closely adjacent to the extreme tip, the shallow grooves in the aforementioned Wieber application have a tendency to close up in a manner so as to inhibit thread cutting action.

The instant application is directed toward an improvement which utilizes the advantages of the aforenoted Wieber application and additionally solves the problems of large clearance for chips sharper and better defined cutting edges and provides structure for thread cutting capabilities. Heretofore, when large chip clearance and sharp edges were necessary for a particular drilling screw operation, it has been necessary to have a secondary operation on the screw during manufacture, namely, a sawing or milling cutting operation which provides a large groove in the entering end of the point. This is usually done subsequent to the thread rolling operation and while it admirably serves the purposes for which it was designed, it is, of course, expensive to post handle the screws again for the placement of the slot in the end of the screw shank.

This invention is directed toward an improved die construction which eliminates a post handling operation by placing what may be loosely termed as "a large slot" in the entering end of a fastener during the pinching operation.

More particularly, it is an object of this invention to provide an improved die construction which is sturdy and provides backup strength to the so-called cutting edges of the die, provides a relatively wide range of tolerances for misalignment of opposed dies, and is otherwise well adapted for the pinch pointing operation.

Still another object of this invention is to provide a die construction as above-identified which incorporates structural relations which provide a positive separation of the nib from the shank so as to provide a uniform product for the thread rolling operation.

Still another object of this invention is to provide a die construction which imparts a strong axial separating bias to the nib and the shank in a direction substantially aligned with the axis of the shank while simultaneously imparting a transverse pinching action so that a complex cutting and shearing action takes place in a manner that aids in preserving the die life of the tooling and simultaneously places a groove or diametrical surface in the point of the fastener which is generally parallel to the movement of the opposed dies.

A further object of this invention is to provide a method of making an improved pinch pointed drill point on a threaded type fastener which is rapid, is economical and which is well adapted to mass manufacturing techniques.

A still further object of this invention is to provide a method of making a drill point by a pinching method which provides a large diametrical surface coextensive of the point which provides for large chip clearance and well defined cutting edges.

Still another object of this invention is to provide a method of making a drill screw by a pinch pointing technique wherein a web of material is sucked from the extreme point of the shank in a manner to expose two sharp starter drilling points, each of the drilling points having relatively shallow angles so as to be sturdy and are separated from each other by a shallow groove, there being additional cutting surfaces disposed at 90° to the shallow groove which provide for large chip clearance.

Another object of this invention is to provide a method as above-described wherein the large grooves disposed 90° to the shallow grooves are imposed upon the point in such a manner that the twin points above-referred to lie entirely within a 180° peripheral segment of the entering end of the screw.

Still another object of this invention is to provide a method of forming a pinch point on a fastener wherein two peripheral segments are formed, each segment being essentially that of a bisected pyramid, the points of the two bisected pyramids being shifted axially relative to each other to expose a large diametrical surface for providing cutting edges with large chip clearance.

Still a further object of this invention is to provide a method of providing a pinch pointed drilling screw which may be threaded for either left handed or right handed threads with equal facility and usefulness.

Still another object of this invention is to provide a drilling point type screw which may be driven like a nail as well as providing exceptionally good drilling characteristics in work material such as steel and the like and provides exceptional chip clearance capabilities.

Still another object of this invention is to provide a screw construction which exposes sharp starting cutting points for initial penetration and it is formed with main cutting edges having large chip clearance areas disposed at 90° to the groove defining the sharp starting points, said major cutting edges also providing thread cutting capabilities.

The novel features that are characteristic of the invention are set forth with particularity in the appended claims. The invention itself, both as to its organization and its method of operation, together with additional objects and advantages thereof, will best be understood by the following description of a specific embodiment when read in connection with the accompanying drawings in which:

FIG. 1 is a side elevational view of one form of a completed fastener made in accordance with the inventive concepts.

FIG. 2 is a semidiagrammatic perspective view illustrating the pinching dies and their coaction with the fastener blank and the nib so formed in the pinching operation;

FIG. 3 is a top plan view of one of the dies illustrated in FIG. 2;

FIG. 4 is a side elevational view of the dies shown in FIG. 3;

FIG. 5 is a right hand elevational view of the dies shown in FIG. 3;

FIG. 6 is an enlarged fragmentary view of a portion of FIG. 5;

FIG. 7 is an enlarged fragmentary view of a portion of FIG. 3 taken along lines 7—7 of FIG. 6;

FIG. 8 is an enlarged elevational view of the entering end of the fastener shank after the pinching operation and prior to threading thereof;

FIG. 9 is another elevational view of the entering end shown in FIG. 8 taken at 90° of rotation of FIG. 8 as indicated by lines 9—9 on FIG. 8;

FIG. 10 is an end view of the entering end taken along lines 10—10 of FIG. 8;

FIG. 11 is a view similar to FIG. 8 showing the fastener entering end after the thread rolling operation;

FIG. 12 is a side elevational view taken along lines 12—12 of FIG. 11;

FIG. 13 is an end view taken along lines 13—13 of FIG. 11;

FIG. 14 is a sectional view taken along lines 14—14 of FIG. 12; and

FIG. 15 is a sectional view of the extreme tip of the fastener taken along lines 15—15 of FIG. 12.

Rotary fasteners 10, which drill their own holes in hard work materials such as metal and the like, are experiencing an ever increasing demand particularly with the wide dispersion of power screw drivers in commerce and industry. Fasteners 10 are conventionally formed with a head portion 12 of any suitable configuration and a shank 14 which are here shown threaded with conventional screw threads in FIGS. 1, 11–15 and with an unthreaded blank shank in FIGURES 2 and 8–10. The shank 14 has an entering end 16 at the extremity of the shank 14 opposite to the head 12. The head 12 may be formed with rotation imparting means 18 of any suitable variety.

This invention is concerned with the entering end 16. The so-called pinch pointing of the entering end 16, to form a good drilling point, is of economic and practical importance since the basic machine techniques are well understood and high speed commercial machinery is available for performing this function. Further, the pinch pointing of the entering end 16 may be accomplished while the fastener blank is in unthreaded form, which eliminates post forming operations such as slotting or grooving on the point after the thread rolling or thread cutting operation. The pinching operation is a cold forming operation on an unthreaded screw blank and is done in such a manner that a small nib 20 is removed from the end of the shank 14, said nib being scrap.

Referring to FIG. 2 of the drawings, it will be seen that two opposed dies 22 are used in the pinching operation, the holders for the dies and the die actuating means being shown semidiagrammatically with arrows. The individual dies 22 are preferably identical except for right and left hand considerations and are preferably configured to form a modified long tapered somewhat diamond shaped or pyramidal point on the end 16 of the screw blank. This point while being characterized as being pyramidal in gross is modified from a true pyramidal shape as will presently appear. The dies 22 are preferably made of suitable tool steel material, and each has a body portion 24 with one end of each of the dies being engageable with the fastener blank. Only one die 22 will be discussed, the other die being the mirror image thereof.

The operating face 26 of the die is formed with a somewhat modified V-shape groove 28 in gross which recedes from the operating face. The overall configuration of the groove 28 has an included angle in the range of 30 to 40 degrees as viewed in FIG. 6. It will be appreciated that the operating face 26 is disposed transverse to the movement of the die 22. The groove 28 is further defined by a plurality of relief surfaces 30, 32, 34 and 36 which recede from the operating face 26 in directions opposite (in a sense) from the recession of the V-shaped groove means 28. The groove 28 is outlined by outline surfaces 38 and 40 which are relatively straight and connected by a short vertically extending portion 42 (as viewed in FIG. 6) and a hook-like portion 44 respectively, all of the outlining surfaces being coplanar and transverse to the direction of movement to the dies. While the outlining surfaces are here shown as being of considerable width, in point of fact they are in the vicinity of .005 of an inch and are here shown enlarged for purposes of pictorial clarity.

The V-shaped groove means 28 has a first wall 46 which diverges from the plane of the operating face at a predetermined relatively long shallow angle, the preferred angularity being in the neighborhood of 15 to 20 degrees to provide a rather long point on the end of the shank. The second, and in a sense, opposed wall 48 of the groove means 28 has an angularity substantially similar to the angularity of wall 46 but recedes from the operating face from a different point as compared to the recession of the wall 46. The two walls 46 and 48 are connected by a third hook-like interconnecting wall means portion 50 comprising a first portion 52 which is disposed in a plane substantially parallel with the direction of movement of the pinching dies (which provides a wall surface which is substantially vertical as viewed in FIG. 6), a somewhat flattened portion 54 and a reversely extending portion 56 which joins to the deepest portion of wall 48. It will be noted that the wall portion 52 and wall 46 merge with the operating face at a point coextensive with a bounding surface 60 of relief portion 32 for purposes hereinafter appearing. It will also be noted that the wall 48 and interconnecting portion 56 merge with the operating face at a point 62 which is vertically spaced above point 58 as viewed in FIG. 6.

Viewing FIG. 6 in gross, it will be appreciated that when two mirror image grooves 28 are placed together in close alignment, an essentially pyramidal-shaped chamber is formed, the chamber being similar to a pyramid which has been bisected through opposed corners with one-half of the pyramid being slid axially relative to the other half. The purpose of this will be made apparent hereinafter.

As perhaps best shown in FIG. 5, relief surface 32 is somewhat trapezoidal in shape and relief surface 34 diverges from the plane of the outline surfaces 38 through 44 at an angle greater than the divergence of the line defining the intersection between wall 46 and wall 52 of the groove means 28. This surface 32 acts as a wedge surface in opposition to surfaces 46 and 48 in the groove to cause forceable separation of the nib 20 from the shank 14 of the screw. The groove means 28 where it intersects the top surface of the die 22 is preferably slightly larger in width than the diameter of the shank 14 in its unthreaded form.

Certain relationships in the die are of particular importance. The outline surfaces 38 through 42 give substantial backup strength to the working edges of the die which substantially increases the life of the die. Further, it is important to note that outline surface 42 and surface 38 terminate on sharp edge 60 which is tangent to the confluence of walls 46 and 52 of he slot, said edge 60 being normal to the vertical axis of body 24 and also forms the juncture edge of surface 32. Edge 60 is bounded on each end by relief surfaces 30 and 36, although sometimes relief surface 34 may become large enough to also bound edge 60 (not shown).

Surface 32 is of particular importance in the pinching action in imparting a separating movement to the nib 20 to cause separation of the nib from the shank. Since the diverging angle of surface 32 relative to the plane of major groove wall surfaces 46 and 48 is greater than the angularity of the juncture line of surfaces 52 and 46 and 48 and 56, surface 32 imparts a substantial separating force to the nib even though the surface area of surface 32 is smaller than the active surfaces of the walls of the slot in the pinching action. The advantages of this particular construction will be explained in more detail hereafter.

In operation, the two dies are placed in suitable machinery of commercially available form, and are moved toward and away from each other in a plane transverse to the planes of the operating faces 26 of the dies. A shank of a fastener is disposed between the two dies, the axis of the shank being essentially aligned with the plane of wall 52 of the groove. Edge surface 60 of each of the dies are disposed relative to the ends of the screw shank so that it is spaced from the end a distance greater than the vertical height of the surface 32 of the dies (assuming the dies are disposed for movement as shown in FIG. 2 of the drawings). As the two dies 22 are moved toward each other and toward the shank of the fastener, the shank is first engaged by the area adjacent to edge surface 60 and outline surfaces 42 and 44 of the dies. As the two dies continue to move toward each other, progressively greater portions of surfaces of walls 46 and 48 of the groove means 28 and of trapezoidal surface 32 engages the fastener and a pinching cold forming action takes place. Also greater and greater portions of relief surface 34 and wall portion 52 come into play to impart a separating action at right angles to the separating action caused by surfaces 32 and the major wall portions 46 and 48 of the slot. Thus, a two fold separating movement between the shank 14 and the nib 20 is imparted by the diverging surfaces, said separating action being along the axis of the fastener in two directions at right angles to each other.

As the two dies get closer and closer together, the separating forces become progressively stronger and at a predetermined time prior to the respective outline surfaces engaging their opposites on the other opposed die, the nib is forceably separated from the shank. In other words, while there is cutting action imposed upon the shank relative to the nib by the outboard edges of the outline surfaces at their points of juncture with the wall surfaces of the groove and the various relief surfaces, a separate force is working, namely, the wedging action in the vertical plane and transverse thereto caused by the reverse angularities of the active surfaces of the dies. This literally pulls the nib 20 from the shank 14 of the screw, said separating force becoming so great that at least some of the material is literally torn apart rather than cut apart when the two dies 22 are quite close together. Due to the configuration of the die a web of material is sucked from the shank between opposed edges 60 and along opposed edge surfaces 38 so as to provide very important structural relationships in the entering end 16 of the fastener. This results in a shallow channel on the longer side of the entering end for a considerable portion of the vertical height thereof as well as a relatively deeper channel at the extreme tip of the fastener. However, it is interesting to note that the same thing does not occur relative to the shorter side of the point, i.e., where opposing surfaces 40, 42 and 44 are coming together. It is thought that this does not occur in this area due to the fact that the connecting wall portion 50 between walls 46 and 48 of the respective dies have the effect of distorting the material on the shorter part of the groove in a different manner by pushing material outwardly. This acts in opposition to the sucking action, so that the same forces are not working in this area to cause the sucking of material to leave a groove running up from the offset point on the shallower portion of the point. It will be noted that the interconnecting areas 50 of walls 46 and 48 of the dies, which in a sense extend toward the operating face of the die from the deepest recession of the corresponding points on the walls 46 and 48, has a peculiar significance in terms of causing the material to better flow into the extreme corners of the dies. This is important since it causes the surfaces on the fastener blank which are formed by wall 52 to fill out and become relatively sharp rather than rounded which would normally be expected. It is thought that the complex relationship between the pulling or sucking action caused by the aforementioned coaction of the relief surface is opposed by this hook-like area of intermediate wall 50 with the result of better filling out and better definition of surfaces corresponding to walls 52 of the dies. Inasmuch as this defines the cutting edge in the large chip clearance groove areas of the fastener point, this is peculiarly important.

Due to the flatness or width of the outline surfaces 38 through 44, exact alignment of the two dies is not an absolute necessity. This obtains since the parting action in the vertical plane imposed by the wedging action of surface 32 contributes much of the separating force on the nib. Also, the sharpening of the tools for cutting purposes is not as critical as the dies heretofore, and increased die life is a concomitant of this structure due to the backup strength of the cutting edges.

Referring now to FIGS. 8 through 15, it will be seen that the pinching action of the dies 22 on the essentially round wire stock of the fastener blank forms the entering end 16 in the form of a corner bisected pyramid wherein one-half of the pyramid shape has been slid axially relative to the other half. One other slight distortion of this characterization is that one-half of the point has been slightly rocked outwardly relative to the other half (as perhaps best perceived in FIG. 8) by the configuration of the interconnecting wall means 50 of the V-shape groove means 28 of the dies 22. Surfaces 46 and 48 on one of the dies form surfaces 62 and 66 on the entering end 16 and surfaces 46 and 48 on the other die make corresponding surfaces 64 and 68. The intermediate wall portions 50 of the die grooves 28 form grooves 70 and 72 on opposite sides of the shank as best perceived in FIGS. 8, 9 and 14. It will be noted that surfaces 66 and 68 converge at a point 74 which is axially spaced from the twin points 78 and 80 which are at the extreme tips of surfaces 62 and 64 respectively. A thin web 76 runs inwardly and down from the point 74 but this thin web is not detrimental inasmuch as it does not engage the workpiece material when the point 16 is used in either threaded or unthreaded form.

The pair of spaced points 78 and 80 formed at the extreme terminal end of the shank are relatively sturdy and have substantially the same axial extent. Sturdiness is imparted to the points 78 and 80 by the angularity of the rather rough side walls of the groove 82 which separates and defines the points 78 and 80. The groove 82 is disposed in a plane parallel with the axis of the shank and extends down between the surfaces 62 and 64 as best perceived in FIG. 10. As aforementioned, it will be noted that no corresponding groove is formed between the surfaces 66 and 68. The groove 82 is deeper where it traverses the extreme terminal end of the shank and progressively fades out as it approaches the cylindrical surface of the nondeformed shank. The groove 82 is formed in the shank by the separating force imparted by the dies, such that the web of the nib is literally pulled from the interior of the shank to define the relatively sharp jagged edges of the groove which serve as cutting edges.

The grooves 70 and 72 extend inwardly into the interior of the shank as best perceived in FIG. 14. Due to the configuration of the intermediate wall portions 50 of the dies, a relatively sharp flat diametrical surface 84 is formed on one side of the shank and a mirror image surface 86 is formed on the other side. It will be noted that the surfaces 84 and 86 lie essentially on the diameter and have a relatively great radial extent. It will be further realized that surfaces 84 and 86 are disposed at right angles to the groove 82.

FIGS. 8, 9 and 10 show the fastener shank before it is in threaded form. In certain instances it is desirable to utilize the point in the form shown in FIGS. 8, 9 and 10, but in most instances it is desirable to thread it whereupon it takes a configuration such as shown in FIGS. 11 through 15. More particularly, when the point 16 is threaded with threads 88, it is desirable to arrange the thread rolling dies in a standard thread rolling apparatus so that threads occupy at least a portion of the actual extent of the point. It is preferable that the threads do not extend below (towards the terminal end) point 74. When the threads extend onto surfaces 66 and 68, at least a partial thread 90 is formed on the smaller pyramidal portion of the pointed end. The concomitant of thread rolling the end 16 is that the upper portion of groove 82 becomes closed (as shown in FIG. 14) at 92 however it will be noted that the large grooves 70 and 72 do not close up in the thread rolling due to their vastly larger size and disposition.

When the threaded fastener shown in FIGS. 11 through 15 is applied to a workpiece, the sharp points 78 and 80 act as starter points. Due to the relative sturdiness of the points and the close spacing thereof cutting action immediately occurs upon rotation of the entering end. Further, as will best be seen by cross sectional view of FIG. 15, more than one cutting edge is immediately involved in the starting drilling operation. More particularly, upon rotation of the screw for right hand threaded fasteners, edge 94 starts a cutting action as does edge 98 adjacent to groove 82. The groove 82 is not closed in this vicinity by the thread rolling operation due to the fact that the threads do not extend this far down on the point. When left hand threads are placed upon the screw shank, surfaces 96 and 100 serve as the major cutting edges. Due to the relatively sharp configuration of all of the angular surfaces adjacent the extreme terminal portion of the entering end, the edge surfaces such as 96 and 100 also serve for cutting to some extent in right hand rotation also. The edges 100 and 96 will aid in the drilling operation even though they may not be the primary cutting edges due to the fact that the extreme terminal portions of walls 62 and 64 are not engaged by the thread rolling dies and thus retain their angularity.

As the screw continues to drill through the workpiece, large chip clearance is provided by the diametrical grooves 70 and 72. Also early thread cutting action starts by the starting of the threads such as 90 to cut their way into the work material as the screw progresses therethrough.

It has been found in actual operation, that this pinch pointed screw gives very good starting qualities, i.e., does not become a "spinner" and provides relatively sharp well defined cutting edges which efficaciously help in drilling as well as providing good thread cutting action for tapping purposes.

Although a specific embodiment of the invention has been shown and described, it is with full awareness that many modifications thereof are possible. The invention, therefore, is not to be restricted except insofar as is necessitated by the prior art and by the spirit of the appended claims.

I claim:

1. A drill point screw having a head portion and a threaded shank portion, said shank portion having an entering end remote from said head portion, said entering end being characterized as having a generally pyramidal shape, a first half of the pyramid being axially advanced in a direction away from said head portion relative to the second half of the pyramid to provide an apex on the first advanced half which is axially spaced from the apex of the second half, said apex on the first half forming the tip of the screw, a groove separating said two halves, the lateral opposite edges of said first advanced half being spaced by said groove from the lateral opposite edges of said second half and said first lateral opposite edges being located radially outwardly of the screw axis a greater distance than said second lateral opposite edges to provide flat surfaces adjacent said first lateral opposite edges whereby the lateral opposite edges of said advanced first half present lateral cutting edges on opposite sides of said entering end.

2. A device of the type claimed in claim 1 wherein said halves are each defined by a pair of converging surfaces.

3. A device of the type claimed in claim 1 wherein said halves are each defined by a substantially smooth curved segment of arc of less extent than 180 degrees.

4. A device of the type claimed in claim 1 wherein the threaded portion on said shank extends downwardly to include partial threads on both of said halves of said entering end.

5. A drill point screw having a head portion and a threaded shank portion, said shank portion having an entering end remote from said head portion, said entering end being characterized as having a generally pyramidal shape, a first half of the pyramid being axially advanced in a direction away from said head portion relative to the second half of the pyramid to provide an apex on the first advanced half which is axially spaced from the apex of the second half, a groove separating said two halves and defining flat cutting surfaces on said advanced half whereby the lateral opposite edges of said first advanced half are radially spaced edges, a groove bisecting the apex of said first advanced half to define a twin point at said entering end.

6. A device of the type claimed in claim 5 wherein said halves are each defined by a pair of flat converging surfaces, with the two surfaces defining the first advanced half being separated by a continuation of the groove bisecting its apex.

7. A device of the type claimed in claim 5 wherein said halves are defined by a substantially curved segment of arc of less extent than 180 degrees, said first advanced half being divided by a groove which is a continuation of the groove bisecting its apex.

8. A device of the type claimed in claim 5 wherein said threaded portion of said screw on said shank extends downwardly to include partial threads on both of said halves of said entering end.

References Cited by the Examiner

UNITED STATES PATENTS

| | | | |
|---|---|---|---|
| 45,133 | 11/64 | Bonwill | 85—47 |
| 1,638,230 | 8/27 | Alsaker | 85—47 |
| 2,175,228 | 10/39 | Stronach | 10—53 |
| 2,558,379 | 6/51 | Phipard | 85—44 |
| 2,740,136 | 4/56 | Chiaberta | 10—10 |
| 2,956,470 | 10/60 | Knohl | 85—47 |
| 3,079,831 | 3/63 | Gutshall | 85—47 |

EDWARD C. ALLEN, *Primary Examiner.*